UNDERWATER GUIDANCE METHOD AND APPARATUS

Original Filed Aug. 8, 1967 4 Sheets-Sheet 1

CHARLES K. DANIELS
JOHN P. McCARTHY
INVENTORS

BY Ralph L. Caldwell
Caldwell and Kelly

ATTORNEYS

UNDERWATER GUIDANCE METHOD AND APPARATUS

Original Filed Aug. 8, 1967 4 Sheets-Sheet 2

CHARLES K. DANIELS
JOHN P. McCARTHY
INVENTORS

BY Ralph L. Caldwell Jr.
Caldwell Jr. and Kelly

ATTORNEYS

UNDERWATER GUIDANCE METHOD AND APPARATUS

Original Filed Aug. 8, 1967 4 Sheets-Sheet 3

CHARLES K. DANIELS
JOHN P. McCARTHY
INVENTORS
BY Ralph L. Caldwell
Caldwell and Kelley
ATTORNEYS UNDERWATER GUIDANCE METHOD AND APPARATUS
Original Filed Aug. 8, 1967 4 Sheets-Sheet 4
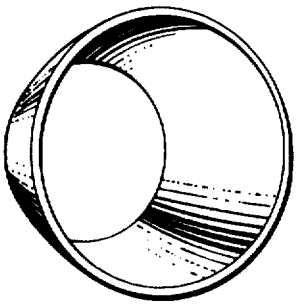
Fig. 12.
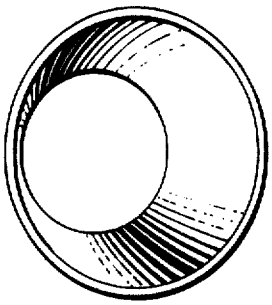
Fig. 13.
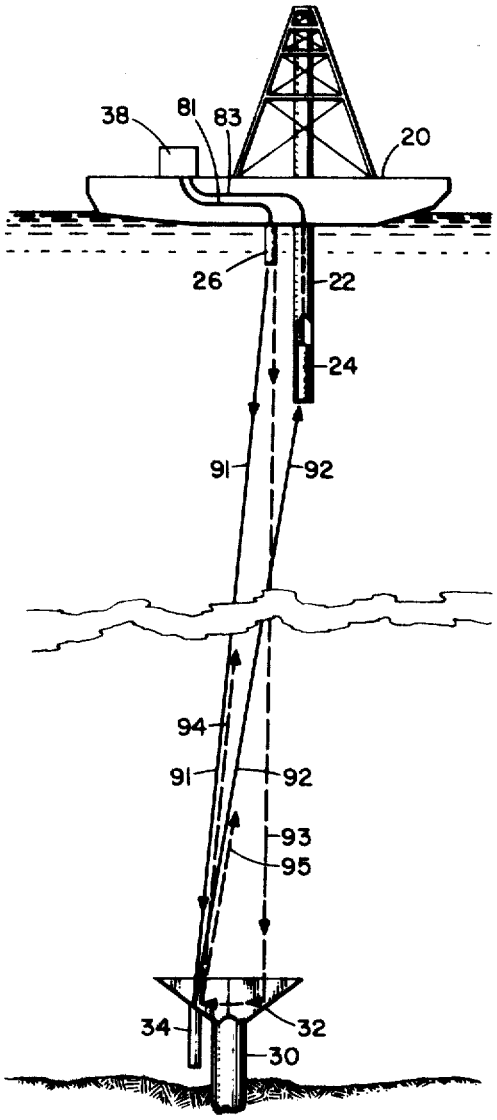
Fig. 14.
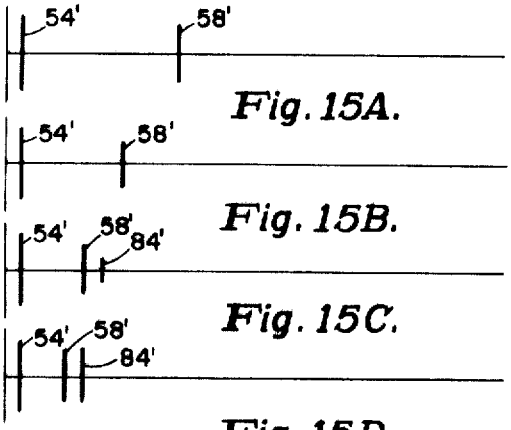
Fig. 15A.
Fig. 15B.
Fig. 15C.
Fig. 15D.
CHARLES K. DANIELS
JOHN P. McCARTHY
INVENTORS
BY Ralph L. Caldwell
Caldwell and Kelly
ATTORNEYS United States Patent Office Re. 27,750
Reissued Sept. 11, 1973

27,750

UNDERWATER GUIDANCE METHOD AND APPARATUS

Charles K. Daniels, Weston, and John P. McCarthy, Cohasset, Mass., assignors to EG&G International, Inc., Bedford, Mass.

Original No. 3,458,853, dated July 29, 1969, Ser. No. 659,186, Aug. 8, 1967. Application for reissue Sept. 8, 1970, Ser. No. 70,603

Int. Cl. G01s *7/52, 9/66*

U.S. Cl. 340—3 R 13 Claims

Matter enclosed in heavy brackets [ ] appears in the original patent but forms no part of this reissue specification; matter printed in italics indicates the additions made by reissue.

ABSTRACT OF THE DISCLOSURE

Method and apparatus for guiding equipment, such as a drill string or blow-out preventer stack, from an ocean platform to a submarine wellhead, including producing at the equipment first acoustical pulses which radiate toward the platform and wellhead; producing at the wellhead second acoustical pulses in response to first acoustical pulses received from the equipment, the second acoustical pulses being radiated toward the platform; receiving the first and second acoustical pulses at the platform; measuring the time difference of arrival at the platform of the first and second acoustical pulses; maneuvering the platform until this time difference becomes a minimum; lowering the equipment when this time difference is a minimum; directively reflecting a portion of the first acoustical pulses from the wellhead back toward the equipment and toward the platform as reflected acoustical pulses; receiving part of the reflected acoustical pulses at the platform; maneuvering the platform until the amplitude of the received reflected acoustical pulses becomes a maximum; and lowering the equipment into the wellhead when the amplitude of the received reflected acoustical pulses is a maximum.

Prior art

This invention relates to guidance methods and apparatus and more particularly to a method and apparatus for guiding equipment from a vessel positioned on the surface of a body of water to an underwater wellhead and finds particular utility in guiding drill strings into submarine wellheads.

In drilling underwater oil wells, drilling crews often remove drill strings from and reinsert them into submarine wellheads and lower other equipment to these wellheads. In the past they used conduits, guide lines and other means extending from the drilling platform to the submarine wellhead, but these means have not been completely satisfactory. Quite often the conduit has been removed from the wellhead and is not available for reentry. If guide lines break reentry is impossible until they have been reinstalled.

Attempts have also been made to use television cameras and magnetic field indicating means for reentry. Poor visibility caused by particles suspended in the water in and around the wellhead limits the use of a television camera. The magnetic field producing means located at the wellhead is limited by the fact that it depends upon power from either a self-contained generating source or a separate power source located at the surface of the sea.

Objects

Accordingly, it is the principal object of this invention to provide a method and apparatus for accurately guiding equipment from an ocean platform to a submarine wellhead.

A subsidiary object is to provide such a method and apparatus which shall be thoroughly reliable in operation and easily mastered by members of a drilling crew.

Further objects and advantages will become apparent hereinafter.

Summary of the invention

The above objects of the invention are achieved by installing a funnel-shaped vessel having a large opening with its smaller opening affixed to the top of a submarine wellhead. This vessel may be shaped like a frustrum of a right regular pyramid, a frustrum of a right circular come, part of a paraboloid of revolution, or part of a hyperboloid of revolution, or it may be a trihedral corner reflector with the corner cut off. Disposed within the funnel-shaped vessel near the wellhead pipe is an acoustical transponder. When this acoustical transponder receives a first pulse of acoustical energy it radiates a second pulse of acoustical energy. The first pulse of acoustical energy emanates from a pulsed acoustical energy source mounted at the equipment, such as at the lower end of a drill string being lowered into the wellhead. An acoustical receiver, such as a hydrophone, located at the ocean platform, receives acoustical pulses impinging upon it and converts them into pulses of electrical energy. The acoustical receiver may, alternately, be located adjacent to the pulsed acoustical energy source, or in drilling operations somewhere between the platform and the equipment, in which case suitable connectors will have to be provided from the acoustical receiver to a suitable time and amplitude display on board the ocean platform. The first pulse of acoustical energy generated by the pulsed acoustical source radiates toward the funnel-shaped vessel and transponder, and toward the acoustical receiver located at the ocean platform. The transponder reacts by radiating second pulses of acoustical energy toward the acoustical receiver which converts both the first and second pulses of acoustical energy into pulses of electrical energy. These pulses of electrical energy are displayed on a time base by the time and amplitude display apparatus. The distance between pulses on the display represents the time difference of receipt by the acoustical receiver of the first and second pulses of acoustical energy. When this time difference is a minimum the drill string is disposed directly over the wellhead. The ocean platform may be maneuvered to obtain the minimum time difference and the equipment or drill string can be lowered while it is a minimum. The funnel-shaped vessel may also be a trihedral corner reflector. In this event, when the time difference is a minimum another pulse will appear upon the display. This is a reflected pulse of acoustical energy received from the reflector. Portions of the first pulses of the acoustical energy generated by the source impinge upon the reflector and are reflected as reflected pulses of acoustical energy toward the source and the acoustical receiver. The ocean platform is then maneuvered until the amplitude of the received reflected acoustical pulse is a maximum. This confirms, for example, that the drill string is aligned with the wellhead and it may be lowered therein. As the drill string approaches very closely to the corner reflector, the first acoustical pulse, the second acoustical pulse and the reflected acoustical pulse all tend to merge. At this point the drill string is entering the wellhead.

The above objects will be readily understood by those skilled in the art by reading the following detailed description of a particular embodiment utilized in exploration coring, oil well drilling, or work over operations. It is to be understood that the invention is not limited to the specific method and apparatus disclosed and described but that it has more general utility.

Description of the drawing

FIGURES 8 through 13 illustrate funnel-shaped vessels that may be utilized at the wellhead;

FIGURE 14 illustrates an alternative embodiment of the present invention; and

FIGURES 15A through 15D illustrate the displays produced with the embodiment of FIGURE 14.

Detailed description

Figure 1:
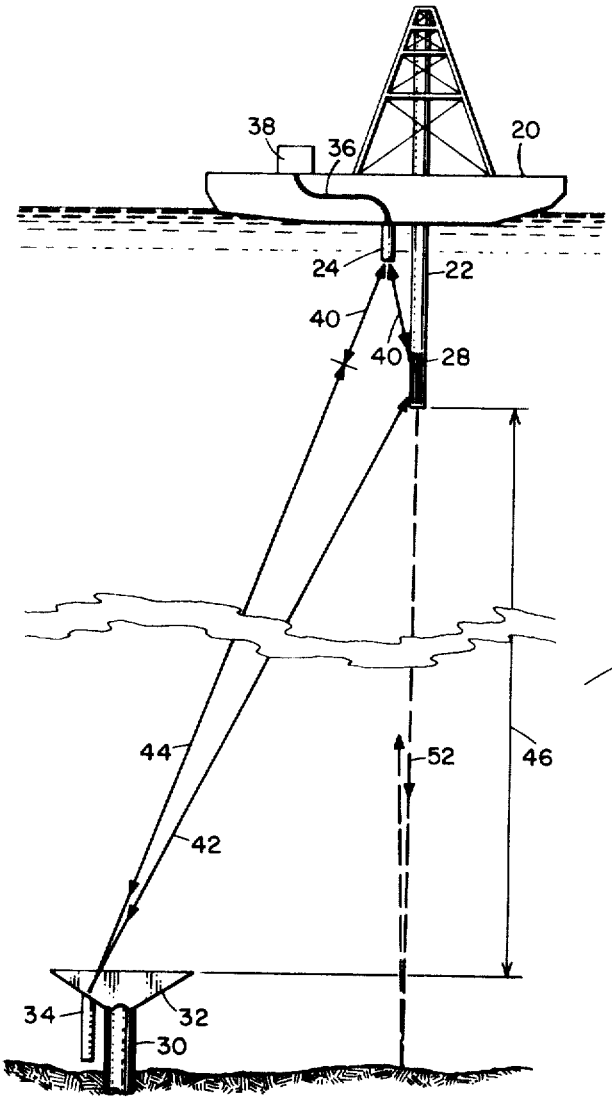
FIGURE 1 is a schematic representation of the invention showing a drill string lowered a short distance below the ocean platform and out of alignment with the wellhead.
Figure 2:
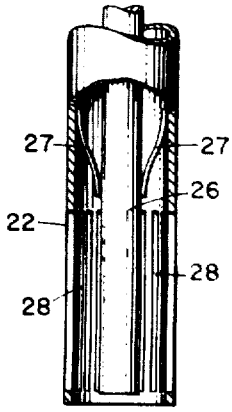
FIGURE 2 illustrates a pulsed acoustical source installed in the lower end of a drill string.

FIGURE 1 illustrates ocean platform 20 floating on a body of water. Platform 20 may be a floating vessel, tug, drilling barge, jack-up rig, or the like. Platform 20 supports drill string 22 and acoustical receiver 24 by means well known in the art. Acoustical receiver 24 may be a hydrophone extending three or four feet downwardly from the bottom surface of platform 20. Drill string 22 likewise may extend downwardly through the bottom surface of platform 20. For purposes of explanation, we shall assume that it extends some 40 feet below the end of acoustical receiver 24. Pulsed acoustical energy source 26 is installed within the lower end of drill string 22 opposite slots 28, as illustrated in FIGURE 2. It is centered within drill string 22 by spring fingers 27. During operation pulses of acoustical energy emanate from source 26 through slots 28 toward acoustical receiver 24 and toward wellhead 30. Pulsed acoustical energy source 26 may take various forms. It may be a magnetostrictive device that generates pulses of acoustical energy when a current is caused to flow through a wire coiled around the magnetostrictive device. Other forms of pulsed acoustical energy may be used, such as electromagnetic or piezoelectric devices. Pulsed acoustical energy source 26 may be self-powered, or may be powered through a cable, not shown, passing through drill string 22 to platform 20. This latter scheme is not preferred in actual practice. Funnel-shaped vessel 32 is mounted directly on wellhead 30 substantially as illustrated in FIGURE 1. Acoustical transponder 34 extends through the bottom surface of funnel-shaped vessel 32, is disposed close to wellhead 30, and is adapted to receive acoustical pulses directly from pulsed acoustical energy source 26. Cable 36 connects acoustical receiver 24 to time and amplitude display apparatus 38 which produces waveforms representing acoustical pulses such as illustrated in FIGURES 4A through 4D and FIGURES 7A through 7C.

If a pulse of acoustical energy is produced by pulsed acoustical energy source 26, a portion of this pulse propagates toward acoustical receiver 24 while another portion propagates toward wellhead 30 and funnel-shaped vessel 32. The latter portion is received by transponder 34 which produces another pulse of acoustical energy, either immediately or after a fixed time, a portion of which pulse propagates toward acoustical receiver 24. FIGURE 1 illustrates that a portion of an acoustical energy pulse produced by source 26 travels a distance 40 from the lower end of drill string 22 to acoustical receiver 24 while another portion of the same pulse travels a distance 42 toward transponder 34. Similarly, a portion of the same pulse travels path 52 to the bottom and back to acoustical receiver 24, as illustrated. The pulse of acoustical energy produced by transponder 34 travels a distance 44 plus distance 40 toward acoustical receiver 24.

Figure 4A:
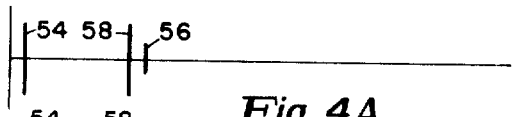
FIGURES 4A through 4D, illustrate schematically the displays produced when maneuvering the ocean platform according to FIGURE 3.
Figure 4B:
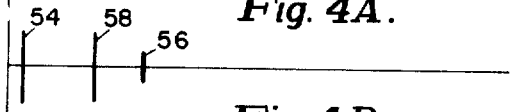
Figure 4C:
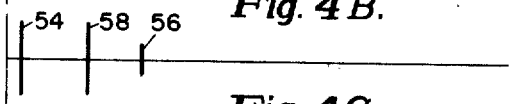
Figure 4D:
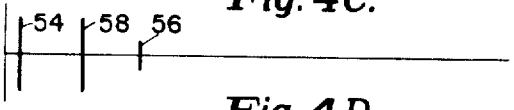

FIGURES 4A through 4D illustrate schematically the waveforms of electrical pulses produced by acoustical receiver 24 in response to acoustical pulses impinging thereon. To facilitate understanding, the acoustical noise associated with these pulses is not shown. In FIGURES 4A through 4D pulse 54 represents that portion of the acoustical pulse produced by source 26 that travels distance 40 to acoustical receiver 24. Similarly, pulse 56 represents the bottom pulse that travels along path 52. In FIGURE 4A pulse 58 represents the pulse directed by transponder 34 toward acoustical receiver 24. The horizontal distance in FIGURE 4A between pulses 54 and 58 represents and is proportional to the sum of distances 42 and 44 of FIGURE 1. One-half of the sum of distances 42 and 44 is roughly equal to distance 42 from acoustical source 26 to wellhead 30. In FIGURE 4B platform 20 has been maneuvered so that the horizontal distance between pulses 54 and 58 is somewhat smaller. Likewise in FIGURE 4C the distance is still smaller. In FIGURE 4D platform 20 has been maneuvered until the distance between pulse 54 and 58 is a minimum. This is equivalent to distance 46 in FIGURE 1. Distance 46 is, of course, the vertical distance between source 26 and wellhead 30.

Figure 3:
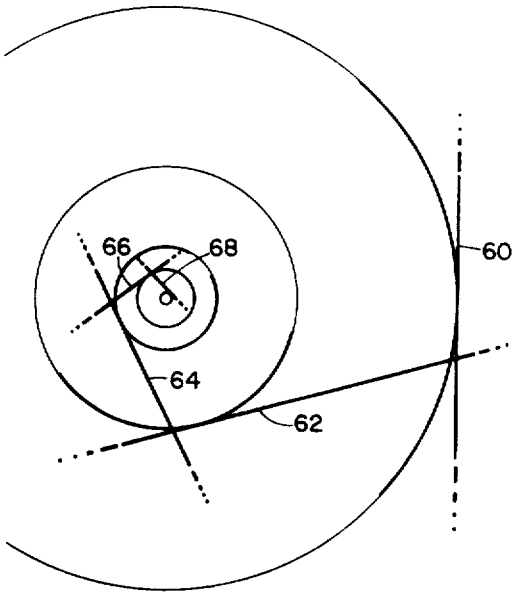
FIGURE 3 represents schematically in plan view a method of maneuvering the ocean platform.

Ocean platform 20 is usually so moored that it can be maneuvered quite accurately. Referring to FIGURE 3, assume that platform 20 is maneuvered in either direction along course 60 while pulses 54 and 58 of FIGURES 4A through 4D are observed on display 38. At some point the horizontal distance between pulses 54 and 58 approaches a minimum. Thereafter this distance begins to lengthen. The direction along course 60 is then reversed for a short distance and a new course taken at approximately right angles to course 60; say, for example, course 62. The same procedure is followed and another course 64 substantially at right angles to course 62 is taken. This is repeated with courses 66, 68, etc. until the point is reached where small course changes in any direction of platform 20 only cause increases in the distance between pulses 54 and 58. Drill string 22 is then vertically aligned with wellhead 30.

Obviously time and amplitude display apparatus 38 can be so calibrated that the horizontal distance between pulses 54 and 58 is read as one-half the sum of distances 42 and 44 of FIGURE 1. Then, when the vertical distance between the lower end of drill string 22 and wellhead 30 is known, platform 20 can be maneuvered until this distance is read on display apparatus 38.

As the drill string is lowered to various heights above wellhead 30, it will be stopped and the foregoing process repeated to confirm the alignment. Thus, referring to FIGURE 5, when drill string 22 has been lowered to a vertical distance above wellhead 30 represented by reference number 76, which distance may be 15 or 20 feet above funnel-shaped vessel 32, the same procedure may be repeated until the alignment shown in FIGURE 6 is obtained. If the minimum distance is maintained and if display apparatus 38 has a revolution, for example, within one foot, drill string 22 can be slowly dropped into wellhead 30. However, before doing this it is desirable that the alignment be confirmed by a method now to be described.

Figure 5:
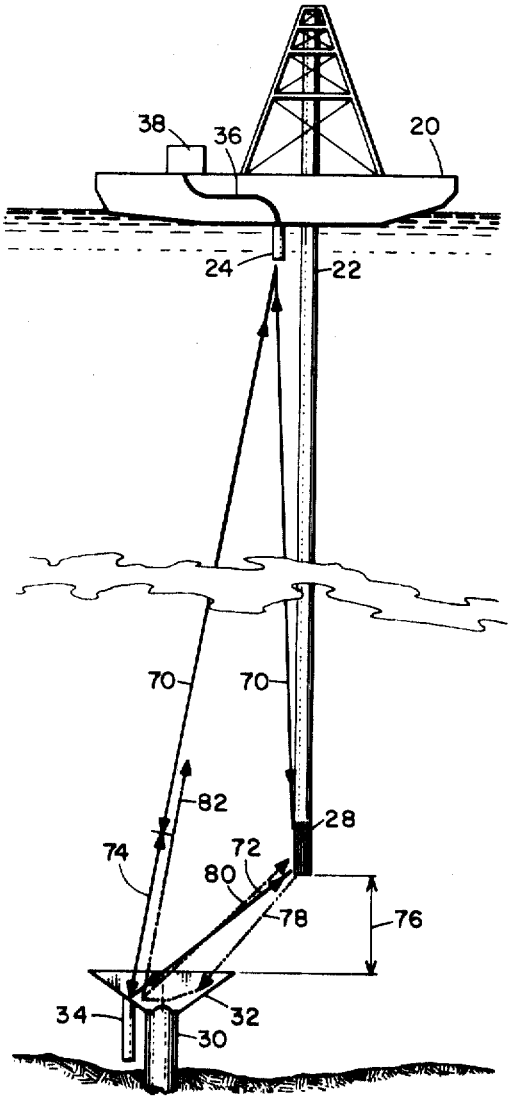
FIGURE 5 is a schematic representation of the invention showing a drill string lowered to within a short distance of the wellhead and out of alignment therewith.
Figure 6:
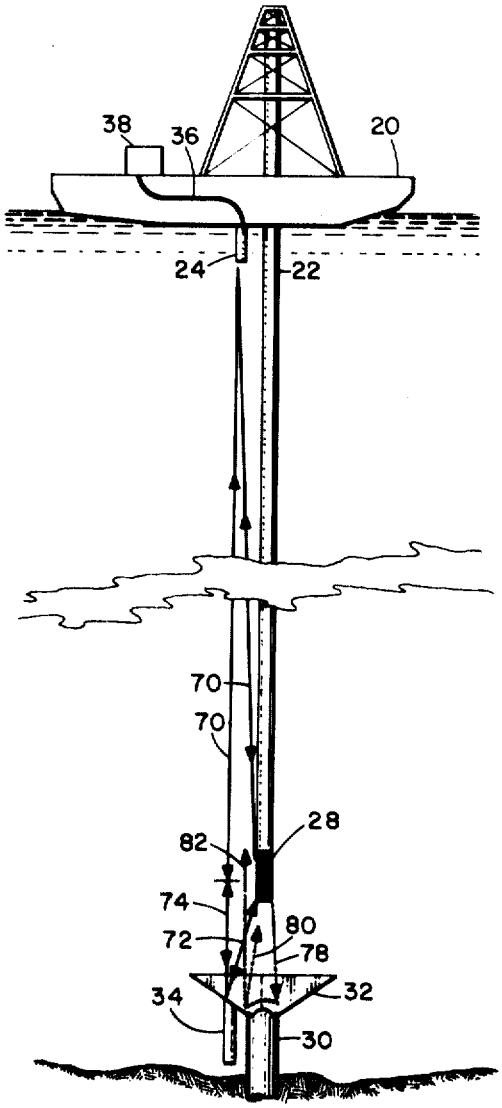
FIGURE 6 is a schematic representation of the invention showing a drill string lowered to within a short distance of the wellhead and in alignment therewith.
Figure 7A:
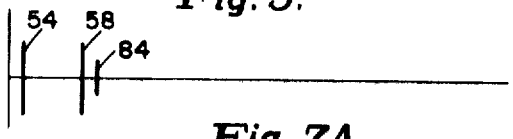
FIGURES 7A through 7C, illustrate the displays produced when maneuvering the ocean platform according to FIGURE 3, including the display produced when dropping the drill string into the wellhead according to the present invention.
Figure 7B:
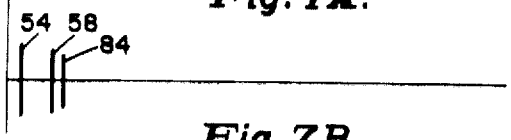
Figure 7C:
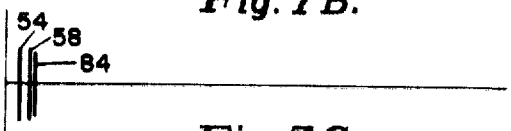

Referring to FIGURE 5, if funnel-shaped vessel 32 is trihedral corner reflector, a portion of the acoustical pulse emitted by pulsed acoustical source 26 will impinge upon the surface of the corner reflector. The characteristics of the corner reflector are such that if an acoustical pulse is incident on the active area of the corner reflector, the reflected pulse will be substantially parallel to the incident pulse. Remembering that drill string 22 is close to alignment with wellhead 30, the reflected pulse will also be directed toward acoustical receiver 24 as illustrated schematically in FIGURE 5 by path 78 for the incident pulse, path 80 for that portion of the pulse reflected back toward acoustical source 26, and path 82 for that portion of the reflected acoustical pulse that impinges upon acoustical receiver 24. Referring now to FIGURES 7A through 7C and ignoring reflected bottom pulses (not shown), pulse 54 represents the direct acoustical pulse from acoustical source 26 and pulse 58 represents the acoustical pulse from transponder 34. Pulse 84 represents that portion of the reflected acoustical pulse that impinges upon acoustical receiver 24. With the same maneuvering as described above with reference to FIGURE 3, the lower end of drill string 22 may be maneuvered so that pulse 84 rises in amplitude. Comparing FIGURE 6 with FIGURE 5, as drill string 22 comes closer in alignment with wellhead 30 and funnel-shaped vessel 32, greater portions of the reflected acoustical pulses will impinge upon acoustical receiver 24 and the amplitude of pulse 84 will increase. As the lower end of drill string 22 is then dropped into wellhead 30 pulses 54, 58 and 84 of FIGURE 7C merge together as illustrated. In practice ocean currents may cause the lower end of drill string 22 to sway a distance considerably greater than the length of the top edge of funnel-shaped vessel 32. Hence, it is necessary that pulses 54, 58 and 84 be watched carefully so that drill string 22 is lowered only when pulse 84 is at a maximum and that the three pulses merge when it is dropped into wellhead 30.

Figure 8:
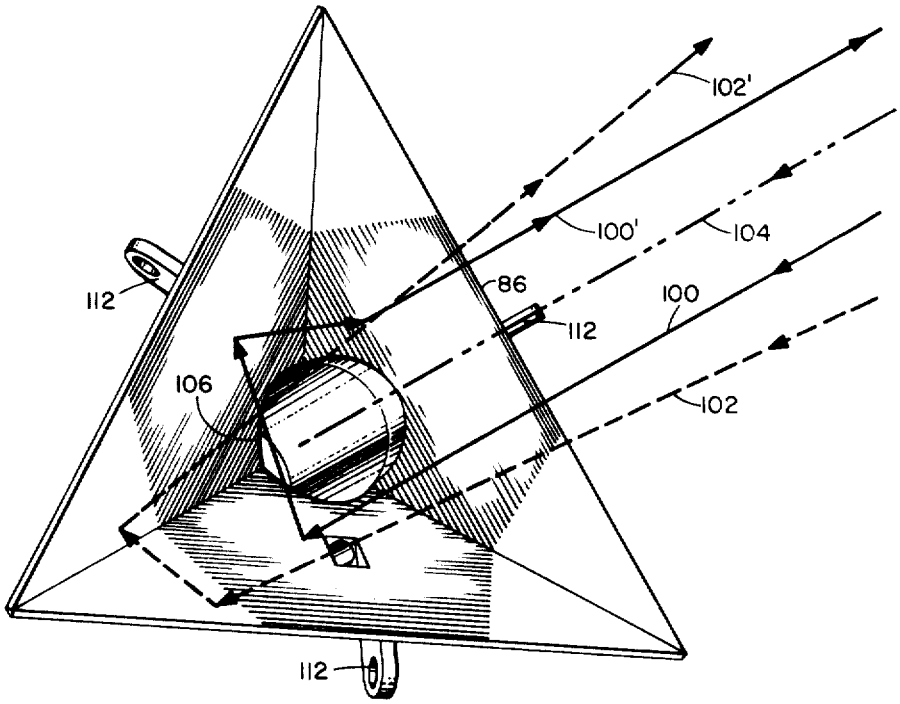
Figure 9:
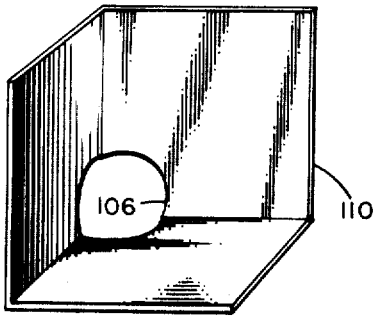

FIGURE 8 illustrates triangular trihedral corner reflector 86 consisting of three reflecting planes perpendicular to each other, assembled to form a right angle corner. In general, a ray incident upon an interior surface of corner reflector 86 is reflected from each of three surfaces successively and returned in a direction parallel to the incident ray. The path of such a ray is shown as ray 100–100'. Some rays, upon entering corner reflector 86 are reflected only twice and will go off at an angle oblique to the incident ray. Such a ray is lost as an echo and is represented as ray 102–102'. Ray 100 entering a reflector 86 parallel to axis 104 and impinging upon the shaded region will be triply reflected and returned in a direction parallel to axis 104. The shaded region represents the maximum effective area of triple reflection. Rays impinging on the unshaded regions will be doubly reflected and lost. Obviously, the unshaded regions may be removed from such a corner reflector; the remaining portion being utilized as the corner reflector. The same considerations apply to rays impinging on the surfaces of square trihedral corner reflector 110 of FIGURE 9. Corner reflector 110 produces reflected acoustical pulses of somewhat greater amplitude than corner reflector 86 of FIGURE 8. In oil well drilling applications corner 106 of reflectors 86 and 110 may be removed to facilitate entry of drill string 22 into wellhead 30.

Figure 10:
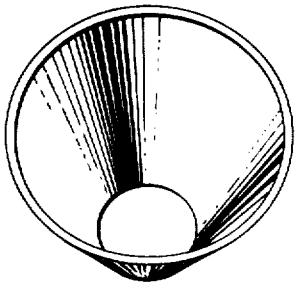
Figure 11:
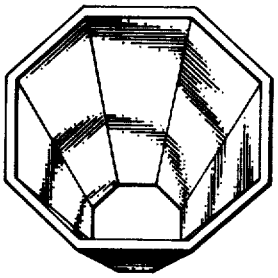

In some applications, the corner reflector method of guiding drill string 22 into wellhead 30 may not be used. In these applications funnel-shaped vessel 32 may take one of the forms illustrated in FIGURES 10 through 13. In FIGURE 10, funnel-shaped vessel 32 is a frustrum of a right circular cone. Similarly, in FIGURE 11 it is a frustrum of a right regular pyramid. In FIGURE 12 it is a paraboloid of revolution with the closed end removed for entry of the drill string. In FIGURE 13 it is a hyperboloid of revolution with the closed end likewise removed.

In operation, the operator may desire to maneuver for a minimum distance between pulses 54 and 58 with the drill string lowered a short distance below the lower end of acoustical receiver 24, making use only of transponder 34. However, if the operator knows the actual distance from the lower surface of platform 20 to the top edge of funnel-shaped vessel 32, he may wish to lower the drill string until it is within 15 or 20 feet of the top edge of funnel-shaped vessel 32. In this event, he first maneuvers for a minimum distance between pulses 54 and 58. If funnel-shaped vessel 32 is a trihedral corner reflector he will then also observe reflected pulse 84. He then maneuvers platform 20 until the amplitude of reflected pulse 84 becomes a maximum. At this point he can drop drill string 22 into wellhead 30 observing the merging of pulses 54, 58 and 84.

Alternate embodiment

FIGURE 14 illustrates an alternative embodiment while FIGURES 15A through 15D illustrate schematically the pulses produced by this embodiment. In FIGURE 14, hydrophone 24 is disposed in the lower end of drill string 22 and is responsive to pulses of acoustical energy approaching from below. A different hydrophone configuration mounted on the exterior surface of drill string 22 could be used as well. Pulsed acoustical source 26 mounts on the lower surface of ocean platform 20. Cables 81 and 83 connect source 26 and hydrophone 24 respectively to time and display apparatus 38.

A first pulse of acoustical energy emanating from source 26 travels distance 91 to transponder 34 which reacts by producing a second pulse of acoustical energy, either immediately or at a fixed time later, that travels distance 92 to hydrophone 24. When the first pulse is generated by source 26, a signal pulse 54' is displayed by time and display apparatus 38 as illustrated in FIGURES 15A through 15D. The second pulse received by hydrophone 24 appears as pulse 58' in the display. The distance between pulses 54' and 58' is proportional to the sum of distances 91 and 92. Platform 20 may then be maneuvered according to the plan of FIGURE 3 to obtain a minimum for the distance between pulses 54' and 58'. The shortening of this distance is illustrated in FIGURES 15A through 15D.

At some point during this maneuvering a reflected pulse 84' will appear as illustrated in FIGURE 15C. At this point, a portion of the first pulses impinge along path 93 on funnel-shaped vessel 32, which, of course, must be a trihedral corner reflector. The reflected acoustical pulse travels path 94 back toward source 26 and a portion travels path 95 toward hydrophone 24 where it is received, converted to an electrical pulse and is displayed as pulse 84'.

As the maneuvering continues to reduce the distance between pulses 54' and 58' the amplitude of pulse 84' will increase. Drill string 22 will be aligned with wellhead 30 when this minimum distance is achieved and the amplitude of pulse 84' is a maximum. The distance between pulses 58' and 84' will remain fixed as drill string 22 is lowered into wellhead 30.

Conclusion

From the foregoing it will be apparent that we have disclosed a method and apparatus for accurately and reliably guiding equipment from an ocean platform to a submarine wellhead and that the same may be readily mastered by the operators of ocean-type drilling rigs.

It will be understood that various changes in the details, materials, steps and arrangements of parts which have been herein described and illustrated in order to explain the nature of the invention may be made by those skilled in the art. For example, trihedral corner reflectors may be made of material having a thickness equal to one-quarter of the wavelength of the frequency of the pulsed acoustical source in the material to assure that acoustical energy reflected from top and bottom surfaces of the material is in phase in the reflected acoustical pulse. Accordingly all such changes are considered to fall within the spirit and scope of the invention.

We claim:

1. The method of aligning equipment between an ocean platform and a submarine wellhead comprising:

producing first pulses of acoustical energy portions of which radiate toward the wellhead and toward a predetermined point;

producing at the wellhead second pulses of acoustical energy in response to receipt of portions of the first pulses of acoustical energy, portions of which second pulses of acoustical energy radiate toward the predetermined point;

directively reflecting part of the portions of the first pulses of acoustical energy received at the wellhead back from the wellhead toward the predetermined point, as reflected acoustical pulses;

measuring the time difference of arrival at the predetermined point of the portions of the first and second pulses;

receiving the reflected acoustical pulses at the predetermined point; and maneuvering the ocean platform until the time difference becomes a minimum and the amplitude of the received reflected acoustical pulses becomes a maximum.

2. Apparatus for guiding equipment from an ocean platform to a submarine wellhead comprising a tribedral corner reflector located at the wellhead, having a large triangular opening with a small opening at its corner affixed to the top of the wellhead and its axis aligned substantially with the axis of the well;

a hydrophone located at a first predetermined point;

a first pulsed acoustical source located at a second predetermined point for producing first pulses of acoustical energy, portions of which radiate toward and impinge upon the trihedral corner reflector and are directively reflected toward the first predetermined point as reflected acoustical pulses, portions of which are received by the hydrophone, the equipment being located at one of the predetermined points;

a transponder so disposed at the trihedral corner reflector as to radiate second pulses of acoustical energy toward the hydrophone at the first predetermined point in response to receipt of portions of the first pulses of acoustical energy;

means connected to the hydrophone and associated with the source for indicating a time difference between the first and second pulses and adapted to display waveforms of the portions of the received reflected acoustical pulses;

means associated with the ocean platform for maneuvering the equipment until the time difference is a minimum and the amplitude of the portions of the received reflected acoustical pulses reaches a maximum; and means also associated with the ocean platform for lowering the equipment toward the wellhead when the time difference is a minimum and for lowering the equipment into the wellhead when the amplitude of the portions of the received reflected acoustical pulses is a maximum.

3. Apparatus as in claim 2 in which:

the first predetermined point is at the equipment; and the second predetermined point is at the ocean platform.

*4. The method of aligning equipment between an ocean platform and a submarine wellhead comprising:*

*providing a reflector at said wellhead which preferentially reflects incident acoustical energy in a direction substantially opposite to the direction of the incident energy;*

*providing a transmitter of pulsed acoustical energy;*

*providing a receiver of pulsed acoustical energy;*

*transmitting pulsed acoustical energy from said transmitter to said reflector;*

*positioning said transmitter and said receiver between said platform and said wellhead at substantially different levels spaced apart sufficiently to ensure that acoustical energy from said transmitter preferentially reflected by said reflector is received by said receiver at substantially greater amplitude when said transmitter, receiver and reflector are in line than when out of line; and*

*maneuvering said platform, said transmitter, and said receiver with respect to said wellhead until said transmitter, receiver, and reflector are substantially in line, and the amplitude of the acoustical energy reflected by said reflector to said receiver is maximized.*

*5. A method in accordance with claim 4, further comprising:*

*producing a first signal at said receiver in response to acoustical energy transmitted to said wellhead and irrespective of whether said transmitter and receiver are substantially out of line with said reflector, said signal being dependent upon the distance between said transmitter and said reflector; and*

*producing a second signal at said receiver in response to acoustical energy preferentially reflected from said reflector when said transmitter, receiver and reflector are substantially in line, whereby the first signal gives an indication of the distance between the transmitter and said wellhead and the second signal gives an indication of alignment of said transmitter and receiver with said wellhead.*

*6. A method in accordance with claim 5, further comprising extending said equipment to said wellhead when said second signal is maximized.*

*7. The method of aligning equipment between an ocean platform and a submarine wellhead comprising:*

*providing a transmitter of pulsed acoustical energy and a receiver of pulsed acoustical energy at substantially different levels between said platform and said wellhead;*

*transmitting pulsed acoustical energy from said transmitter to said wellhead;*

*producing a first signal at said receiver in response to acoustical energy transmitted to said wellhead irrespective of whether said transmitter, receiver, and wellhead are substantially out of line, said signal being dependent upon the distance between said transmitter and said wellhead;*

*maneuvering said platform, transmitter, and receiver relative to said wellhead, while monitoring said first signal, to reduce the distance between said transmitter and said wellhead and to bring said transmitter, receiver and wellhead toward alignment;*

*producing a second signal at said receiver by preferentially reflecting transmitted acoustical energy from said wellhead to said receiver in a direction substantially opposite to the direction of incidence of the transmitted energy only when said transmitter, receiver, and wellhead are substantially in line; and*

*continuing the said maneuvering until said second signal is maximized.*

*8. A method in accordance with claim 7, wherein said first signal is produced by transponding acoustical energy transmitted by said transmitter to said wellhead.*

*9. Apparatus for guiding equipment from an ocean platform to a submarine wellhead comprising:*

*reflector means located at said wellhead for preferentially reflecting incident acoustical energy in a direction opposite to the direction of incidence;*

*means for transmitting pulsed acoustical energy;*

*means for receiving pulsed acoustical energy;*

*and means for positioning one of said transmitting and receiving means adjacent to a lower end of said equipment and the other of such means at a level spaced substantially above said one means sufficiently to ensure that acoustical energy transmitted from said transmitting means and preferentially reflected by said reflector means is received by said receiving means at substantially greater amplitude when said transmitting means, receiving means, and reflector means are in line substantially vertically than when out of line;*

*10. Apparatus in accordance with claim 9, wherein said reflector means is a corner reflector.*

*11. Apparatus in accordance with claim 9, wherein said equipment is a drill string suspended from said platform and having said transmitting means supported adjacent to the lower end thereof.*

*12. Apparatus in accordance with claim 9, further comprising means for producing a first signal at said receiving means, dependent upon the distance between said transmitting means and said wellhead, in response to acoustical energy transmitted to said wellhead and irrespective of whether said transmitting means, receiving means, and reflector means are substantially out of line, and means for producing a second signal at said receiving means in response to acoustical energy preferentially reflected by said reflector means only when said transmitting means, receiving means, and reflector means are substantially in line.*

*13. Apparatus in accordance with claim 12, wherein said means for producing said first signal comprises a transponder for sending said first signal to said receiving means in response to acoustical energy transmitted by said transmitting means to said wellhead.*

References Cited

UNITED STATES PATENTS

The following references, cited by the Examiner, are of record in the patented file of this patent or the original patent.

| | | | |
|---|---|---|---|
| 2,520,520 | 8/1950 | Woodward | 340—2 X |
| 3,195,677 | 7/1965 | Hillery et al. | 181—.5 |
| 3,222,634 | 12/1965 | Foster | 340—3 |
| 3,293,867 | 12/1966 | Dean. | |
| 3,336,572 | 8/1967 | Paull et al. | 340—6 |

RICHARD A. FARLEY, Primary Examiner

U.S. Cl. X.R.

340—3 E, 8 FT